Nov. 18, 1952 — E. MERCIER ET AL — 2,618,247
VAPOR GENERATOR

Filed Feb. 11, 1948 — 2 SHEETS—SHEET 1

Ernest Mercier & Marcel Ehlinger
INVENTORS
By Corey & Jacobs
Their Attorneys

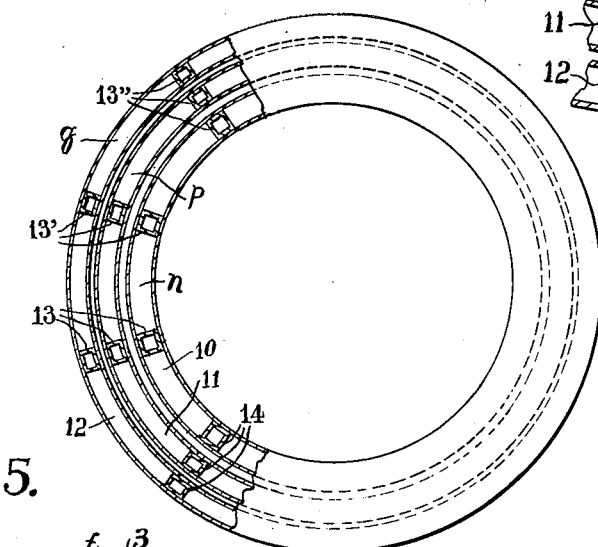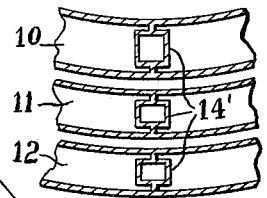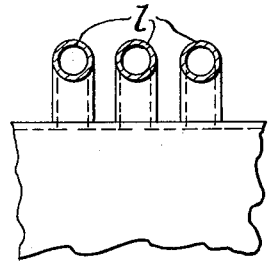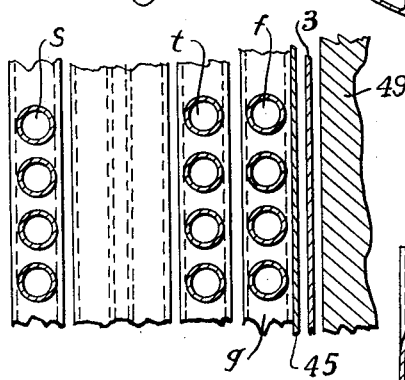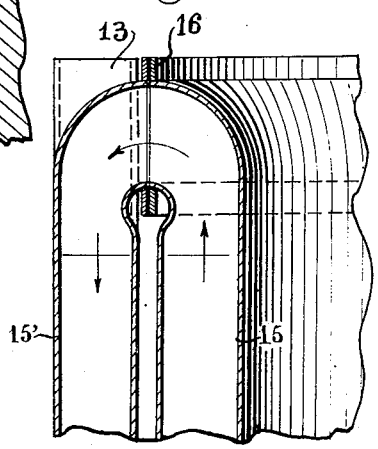

UNITED STATES PATENT OFFICE 2,618,247

VAPOR GENERATOR

Ernest Mercier and Marcel Ehlinger, Paris, France, assignors, by mesne assignments, to Moore, Inc., Atlanta, Ga., a corporation of Georgia Application February 11, 1948, Serial No. 7,586
In France June 30, 1943

Section 1, Public Law 690, August 8, 1946
Patent expires June 30, 1963

10 Claims. (Cl. 122—127)

The present invention relates to a vapor generator of the type comprising a tube boiler in which the gases passing between the tubes of this boiler have approximately the same pressure as the vapor circulating within the tubes.

An important object of the present invention is to provide a vapor generator comprising a pressure vessel providing a wall enveloping a gas space for confining hot gases therein under substantial pressure, and a lining wall or partition spaced from said wall of said pressure vessel interiorly thereof and cooperating with said wall of said pressure vessel to confine between said wall and said lining partition a liquid under pressure for the generation of vapor from said liquid by the heat of the gases. This partition is so formed and arranged relative to the wall of the pressure vessel as to provide separation of said liquid from the hot gases within the pressure vessel but requires the cooperation of said wall of said pressure vessel to confine said gases under said pressure within the lining wall enveloping said gas space of said vessel. The liquid thus confined and the generated vapor separate and shield the wall of the pressure vessel from the hot gases.

The lining partition as well as the walls of the other liquid and vapor confining elements of the vapor generator are relatively thin and offer little resistance to the transmission of heat therethrough from the hot gases to the liquid or the vapor, the thickness of these walls being required to be only sufficient to withstand any difference of pressure between that of the gases within the pressure vessel and the vapor pressure. Thus, the lining partition and the walls of the other liquid and vapor confining elements may be of cylindrical form concentric with the axis of the pressure vessel, these cylindrical walls being parallel to the wall of the pressure vessel and spaced therefrom and spaced from each other to provide the liquid and vapor confining spaces therebetween. The lining partition, although not in itself capable of confining the gases under pressure, is supported by the wall of the pressure vessel and the pressure of the liquid or vapor in the space between the lining wall and the pressure vessel wall so that the gases may be confined within the gas space enveloped by the lining wall at a pressure approximating the pressure of the generated vapor.

The annular spaces between these parallel cylindrical walls or partitions may be subdivided to provide tubular passages the lengths of which extend generally parallel to the axis of the pressure vessel. These tubular passages may be connected alternately at their ends to provide a plurality of continuous serpentine passages extending in planes generally radially of the axis of the pressure vessel for continuous flow of the liquid and of the vapor therethrough. The means for subdividing the annular spaces themselves may be thin walled tubular members which provide passages for flow of the combustion gases therethrough in heat exchanging relation to the liquid and the vapor confined within the serpentine passages.

Further objects of the invention will appear in the specification and in the claims.

Figure 2 is a fragmentary horizontal section on line 2—2 of Figure 1.

Figure 2a is a fragmentary view of a modification of the liquid confining elements.

Figure 3 is a view of a detail of the construction.

Fig. 4 is a section on line 4—4 of Fig. 1.

Fig. 5 is a section on line 5—5 of Fig. 1.

Figure 1:
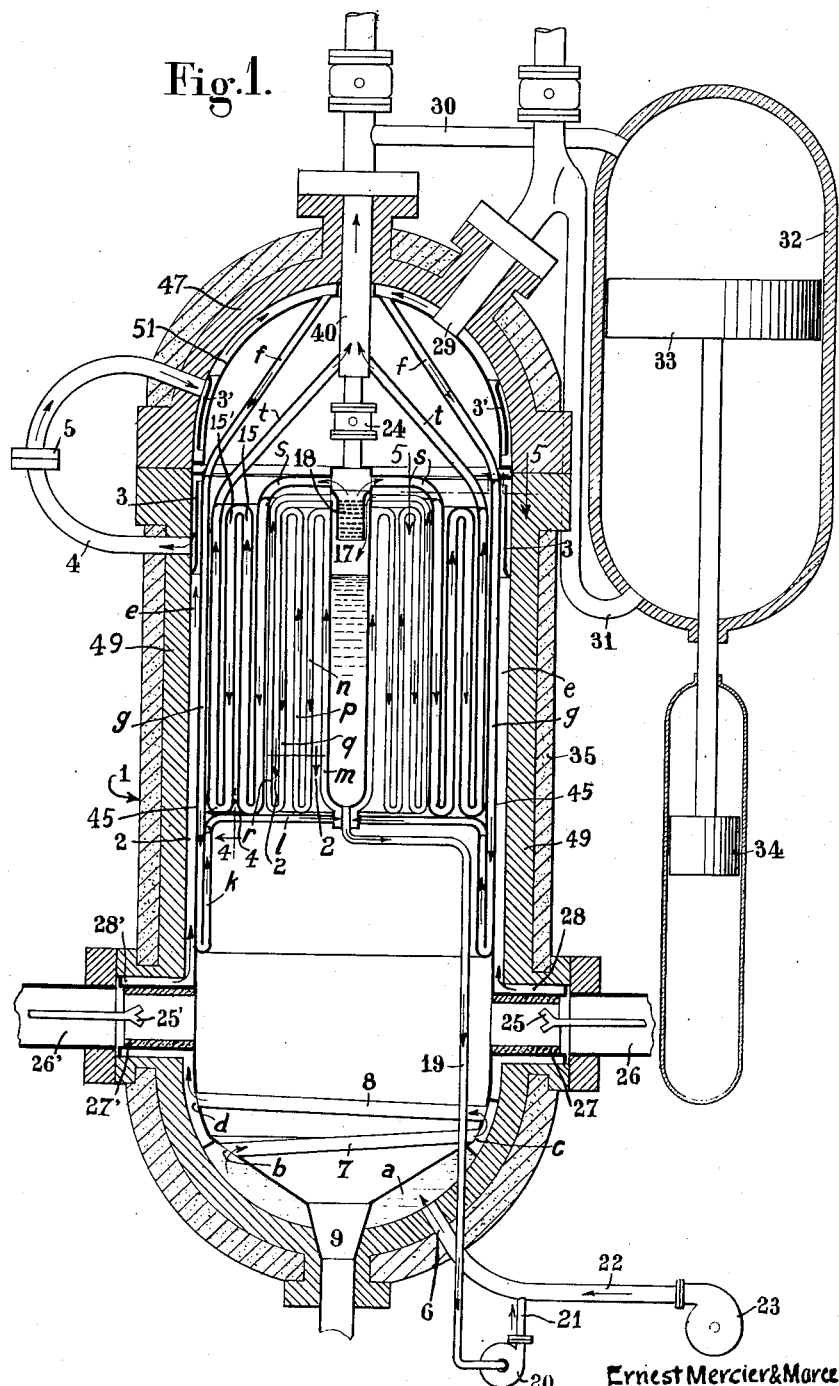
Figure 1 is a central vertical section of a vapor generator embodying the invention.

The pressure vessel 1 provides a wall enveloping a gas space for confining gases therein under substantial pressure. The wall 49 of the body portion of this vessel extends circumferentially about the gas space and is of substantial length transversely of the circumferential extent thereof.

A lining partition 45 spaced from the wall 49 interiorly thereof cooperates with the wall 49 to confine a liquid under pressure in the space 2 therebetween for the generation of vapor from said liquid. In the space 2 subdividing partitions are arranged which provide for an even distribution of the liquid over the whole surface of the lining and the cooperating vessel wall 49.

A pressure confining head 47 is removably attached to the body of the pressure vessel and cooperates with the body for confining the gas within said vessel. The head 47 has a lining wall or partition 51 spaced from the wall of the head 47 for confining the liquid to be vaporized therebetween. A conduit 4 is adapted to be connected to the wall 49 of the pressure vessel and to the wall of the head and cooperates with openings respectively through said walls to provide for flow of the liquid between the liquid space 2 and the liquid space formed between the wall of the head 47 and the lining partition 51 thereof.

5 is a flanged coupling at which the conduit 4 may be broken to provide for removing the head 47 from the cylindrical body 49 of the pressure vessel.

3 and 3' are deflecting baffles within the liquid spaces which force the liquid to circulate to reach the ends of the spaces between the walls 49, 47 and the lining partitions 45, 51 adjacent the joint between the cylindrical body and the head.

At the end of the vessel 1 opposite to the head 47 the vessel is formed with a spherical end the wall of which is continuous with the wall of the body.

6 is the inlet of the feed liquid.

7 and 8 represent a slag screen adapted to cool the slag when solid fuel is burned. These screens are made of tubes connected to the space between the pressure vessel wall 49 and the lining partition 45.

9 is an outlet for the slag.

The boiler proper shown by way of example in Figs. 1 and 2 of the drawings consists of a plurality of hollow annular concentric cylindrical liquid confining members positioned within the gas space, subdivided by vertically extending tubular flue members into sectors therebetween acting as boiler tubes. The vertical extent of this structure may be seen in Fig. 1 in which the adjacent annular members are connected at alternate ends so that the sectors are connected in serpentine relation between the passages m and r and between passages s and t.

10, 11 and 12 are three consecutive hollow annular liquid confining members which are the only ones shown in Fig. 2 in order to simplify the drawing. These members have different widths in the radial direction determined so as to give the liquid a suitable circulation speed in each element.

13, 13', 13" and 14 are the tubular flue members arranged in rows radially and preferably evenly circumferentially spaced and extending vertically parallel to the common axis of the annular members 10, 11 and 12 to form the sectors n, p, q between these flue members.

14' in Fig. 2a shows another form of the tubular members.

The combustion gases pass vertically in Fig. 1 into the annular spaces between the annular liquid confining members 10, 11 and 12, Fig. 5, and also through the tubular flue members 13, 13', 13", 14, 14' so as to flow into the space within the head 47, Fig. 1.

At least one row of tubular members has a greater interior width radially and these members may be provided at their upper ends with an adjustable damper, not shown, for adjusting the temperature of the gas exhausting from the boiler.

The several circumferentially spaced sectors of the different annular liquid confining members located in a radial row between two consecutive radial rows of the tubular flue members are connected at their upper parts and at their lower parts alternately in order to constitute a continuous coil providing serpentine passages for the liquid and vapor, the different coils thus obtained operating in parallel in radially extending planes.

Fig. 3 shows at a greater scale than Figs. 1 and 2 a typical detail of an upper joint 16 between two consecutive annular elements, for example, elements 15 and 15', Fig. 1, which provides for flow of the liquid or vapor in succession therethrough and for passage of the gases vertically through the tubular members 13, 13', 13", 14. This joint is easily made by reason of the low difference between vapor and gas pressures.

The liquid and vapor circulation is shown in Fig. 1 by arrows and also by successive letters of the alphabet corresponding to elements successively passed through by the liquid. First this liquid enters the part a of the space 2 between the wall 49 and the lining wall. Baffles are provided in the space 2 adjacent tubes 7 so that the liquid passes through the screen tubes 7 and 8 and through spaces b, c and d and up through the space 2 at e, through pipe 4, then downwardly through passages f and the outer annular liquid confining member g, upwardly through k and across within the screen tubes l, and then through the space m enveloping a central collector separator 17. Then the mixtures of liquid and vapor reach the interior of this collector 17 after passing in succession through the sector passages n, p, q, r. In the collector 17 the vapor passes up through holes in perforated baffle plates 18 acting as separators to separate the liquid from the vapor and then passes through the tubular sector passages s of the superheating elements from which it escapes through the tubes t and reaches the superheated vapor collector 40.

In the boiler shown in the drawing, the liquid separated in the collector 17 is recirculated by means of a pump 20 which sucks the liquid through the pipe 19 at the lower end of the collector 17 and forces this liquid through the pipe 21 into the feed pipe 22 through which feed liquid is supplied by pump 23. A mixing valve 24 connects the central collector 17 containing saturated vapor with the superheated vapor collector 40. This valve is controlled from the exterior and provides for regulating the superheating by mixing saturated vapor with the superheated vapor.

Fuel burners are arranged in openings in the wall of the pressure vessel extending perpendicularly to the axis of the gas space, for instance by pairs, each pair having diametrally opposed burners 25 and 25'.

26 and 26' are the corresponding inlets for air under pressure.

27 and 27' are lining sockets made of a refractory material. These sockets become heated to incandescence by combustion heat and they provide for maintaining the flames of the corresponding burners which for gas pressures approximating the steam pressure have lengths of about ten centimeters only.

28 and 28' are hollow cooling walls in which liquid delivered by the pump to space 2 is forced to circulate. These hollow cooling walls 28 and 28' provide for cooling the outer walls of the refractory lining sockets 27 and 27' respectively and for protecting the wall of the pressure vessel about the burner openings.

29 is the outlet pipe of the burnt gases.

The vapor generator is provided with a regulator device comprising a vapor container 32 for storing a substantial volume of vapor therein at the pressure of the vapor generated in said generator. The container 32 is provided with a piston member 33 movable therein in accordance with variations in the volume of said vapor contained in said vapor container. The vapor space of said container which is located on Fig. 1 at the upper side of the member 33 is connected through a conduit 30 to the vapor collector 40 to receive from the vapor generator excess of the vapor generated over that withdrawn for use from said vapor generator and to discharge from said container vapor to supply the deficiency of vapor delivered by said vapor generated and withdrawn for use concomitantly with movement of the member 33. Said container 32 has a gas space therein at the lower side of said movable member 33 and communicating through a conduit 31 with the gas space within said pressure vessel, whereby the movable member 33 is moved to increase and decrease the volume of the vapor within said container respectively according as the vapor pressure is greater or less than the gas pressure.

The regulator device operates without exerting influence on the temperatures within the boiler.

This regulator may act not only as a reservoir of vapor but also by operating control members adapted to vary the delivery of vapor, the feeding of fuel to the burners and the feeding of liquid to the boiler in accordance with the displacements of the member 33.

A checking device provided with a movable part 34 operatively connected to the movable member 33 provides controlled movement of said member 33 within the container 32. Thus the member 33 is not displaced by small casual variations of the difference between the vapor pressure and the gas pressure.

35 is a covering of non-conducting or heat insulating material enveloping the whole pressure vessel and its heads.

A vapor generator as hereinabove described is well adapted for use with the highest vapor pressures and with the highest superheating temperatures, the superheater and the other elements of the boiler which are subjected to the heat of the gases having only to withstand small pressure differences.

The vapor generating elements of the boiler are required to be formed with walls having a thickness which is only a small fraction of the thickness of the wall of the pressure vessel and capable of withstanding the normal variations in pressure difference between the pressure of the liquid confined therein for generation of vapor therefrom and the pressure of the gases in the gas space but incapable of withstanding pressures of the degree of the gas pressure.

The liquid may be for instance water, mercury or hydrocarbons and the fuel may be a liquid fuel or a pulverulent solid fuel.

What we claim as our invention and desire to secure by Letters Patent is:

1. A vapor generator comprising a pressure vessel having an outer cylindrical wall and an inner cylindrical wall spaced from said outer wall and extending in parallel relation to said outer wall to define a vapor generating space therebetween unobstructed by heat transfer elements for containing a body of liquid and vapor generated therefrom under pressure continuous from wall to wall substantially throughout the length of said space along the axial extent of said cylinders, said spaced walls extending about and enveloping a combustion gas space, means cooperating with said pressure vessel for confining the combustion gases in said gas space at combustion temperature and at an elevated pressure approximating the pressure maintained in said vapor generating space, and means for delivering the liquid to be vaporized to said vapor generating space against the pressure maintained therein, said outer wall having a mechanical strength at the temperature of the liquid and vapor confined in said vapor generating space sufficient to withstand the pressure maintained therein, and said inner wall having a mechanical strength substantially less than that of said outer wall and only slightly exceeding the strength required to withstand the maximum pressure difference between the pressures maintained in said vapor generating space and in said gas space during normal operation of said vapor generator, the thickness of said inner wall being sufficient substantially only to provide separation of said gases from said liquid and vapor under said pressure difference to provide for high heat transfer from said combustion gases to said liquid and vapor.

2. A vapor generator as defined in claim 1 which comprises a pressure confining head removably attached to and having an outer wall cooperating with said outer wall of said pressure vessel for confining the gas within said vessel, said head having an inner wall spaced from the outer wall of said head for confining said liquid to be vaporized and said vapor therebetween, and a conduit connected to said outer wall of said pressure vessel and to said outer wall of said head and cooperating with openings respectively through said outer walls to provide for flow of said liquid and vapor between said space formed between said walls of said pressure vessel and said space formed between said walls of said head.

3. A vapor generator as defined in claim 1 which comprises a vapor container for storing a substantial volume of vapor therein at the pressure of the vapor generated in said vapor generator, said vapor container being provided with a member movable therein in accordance with variations in the volume of said vapor contained in said vapor container, the vapor space of said container being connected to said vapor generator to receive therefrom excess of the vapor generated over that withdrawn for use from said vapor generator and to discharge from said container vapor to supply the deficiency of vapor delivered by said vapor generator and withdrawn for use concomitantly with movement of said member, said container having a gas space therein at the opposite side of said movable member from said vapor space thereof and communicating with the gas space within said pressure vessel, whereby said movable member is moved to increase and decrease the volume of the vapor within said container respectively according as the vapor pressure increases and decreases relative to the gas pressure.

4. A vapor generator as defined in claim 1 which comprises a liquid confining element within said gas space formed with oppositely disposed generally parallel walls cooperating to envelop the liquid space of said element and having their length extending generally parallel to and lengthwise of the walls of said pressure vessel parallel to axial extent thereof to provide a path of liquid flow therethrough generally lengthwise of said pressure vessel, at least one of said walls of said element being formed by a wall of a hollow elongated member providing a gas flow passage extending parallel to said walls of said pressure vessel lengthwise thereof.

5. A vapor generator as defined in claim 1 which comprises a fluid confining member supported within said combustion gas space adjacent said inner wall and formed with opposite parallel walls disposed parallel to said wall of said pressure vessel to provide for flow of said fluid between said walls of said member lengthwise of said member and parallel to the extent of said pressure vessel wall, a plurality of tubular elements connected to said fluid confining member and extending therefrom across said gas space transversely of the length of said fluid confining member, said tubular elements being in spaced relation for passage of said combustion gas therebetween, and a fluid heating element confining a fluid to be heated therein and disposed in said gas space in such relation to said tubular elements that said gas flows in heat transferring relation to said fluid heating element after it passes between said tubular elements.

6. A vapor generator as defined in claim 1 which comprises walls in planes transverse to said outer and inner pressure vessel walls and extending parallel to the axial extent of said cylindrical walls and subdividing said space between said pressure vessel walls circumferentially of said pressure vessel to provide a plurality of paths of flow for said liquid through said space between said outer and inner pressure vessel walls lengthwise thereof.

7. A vapor generator as defined in claim 1 which comprises a heat transfer element in said gas space having a wall extending about a space and confining a fluid therein at a pressure of the degree of the pressure in said space between said outer and inner walls of said pressure vessel, said wall of said element having a mechanical strength only slightly exceeding the strength required to withstand the maximum pressure difference between the pressure of the fluid maintained in said element and the pressure of the gases in said combustion gas space during normal operation of said vapor generator, the thickness of said wall of said heat transfer element being sufficient only to provide for separation of said gases from said fluid in said element under said pressure difference so as to provide for high heat transfer from said gases to the fluid in said element.

8. A vapor generator as defined in claim 7 in which said heat transfer element comprises a plurality of annular concentric fluid confining members disposed within said gas space of said pressure vessel, said wall of said element comprising portions oppositely disposed and parallel in each member and generally parallel to said inner and outer walls of said pressure vessel, partition walls in each annular member extending transversely of said parallel walls thereof and generally parallel to the axial extent of said cylindrical pressure vessel walls and spaced circumferentially about said axis to provide sections in the respective annular members for subdivided flow of fluid therethrough along the axial extent thereof, and means connecting a section of one annular member between two partitions to a section between two partitions of an adjacent annular member concentric therewith for flow of fluid in succession through said sections.

9. A vapor generator as defined in claim 1 which comprises a pressure confining head removably attached to and having an outer wall cooperating with said outer wall of said pressure vessel for confining the gas within said vessel, said head having an inner wall spaced from the outer wall of said head for confining said liquid to be vaporized and said vapor therebetween, a conduit connected to said outer wall of said pressure vessel and to said outer wall of said head and cooperating with openings respectively through said outer walls to provide for flow of said liquid and vapor between said space formed between said walls of said pressure vessel and said space formed between said walls of said head, and baffle partitions adjacent the respective openings in said walls of said pressure vessel and of said head within the liquid spaces between said pressure vessel walls and between said walls of said head and disposed so as to direct the flow of the liquid and the vapor toward the ends of said respective spaces as said liquid and vapor flow through said openings in said walls.

10. A vapor generator as defined in claim 1 which comprises a vapor container for storing a substantial volume of vapor therein at the pressure of the vapor generated in said vapor generator, said vapor container being provided with a member movable therein in accordance with variations in the volume of said vapor contained in said vapor container, the vapor space of said container being connected to said vapor generator to receive therefrom excess of the vapor generated over that withdrawn for use from said vapor generator and to discharge from said container vapor to supply the deficiency of vapor delivered by said vapor generator and withdrawn for use concomitantly with movement of said member, said container having a gas space therein at the opposite side of said movable member from said vapor space thereof and communicating with the gas space within said pressure vessel, whereby said movable member is moved to increase and decrease the volume of the vapor within said container respectively according as the vapor pressure increases and decreases relative to the gas pressure, and a checking device provided with a movable part operatively connected to said movable member and adapted to provide controlled movement of said member within said container.

ERNEST MERCIER.
MARCEL EHLINGER.

REFERENCES CITED

The following references are of record in the file of this patent:

UNITED STATES PATENTS

| Number | Name | Date |
|---|---|---|
| 1,714,893 | Smith | May 28, 1929 |
| 1,827,246 | Lorenzen | Oct. 13, 1931 |
| 1,841,230 | Vuia et al. | Jan. 12, 1932 |
| 1,945,313 | Hoadley | Jan. 30, 1934 |
| 1,948,939 | Noack | Feb. 27, 1934 |
| 2,009,852 | Lum et al. | July 30, 1935 |
| 2,223,856 | Price | Dec. 3, 1940 |
| 2,304,409 | Jeffords | Dec. 8, 1942 |
| 2,312,622 | Brantly | Mar. 2, 1943 |